United States Patent

Carnal et al.

Patent Number: 5,097,697
Date of Patent: Mar. 24, 1992

[54] METHOD AND APPARATUS FOR AIRBURST TESTING CONDOMS AND THE LIKE

[75] Inventors: Glenn P. Carnal; Joel P. Willis, both of Dothan, Ala.

[73] Assignee: Ansell Incorporated, Eatontown, N.J.

[21] Appl. No.: 534,170

[22] Filed: Jun. 6, 1990

[51] Int. Cl.⁵ .............................................. G01M 3/02
[52] U.S. Cl. ........................................................ 73/40
[58] Field of Search ............................... 73/40, 37, 37.8

[56] References Cited

U.S. PATENT DOCUMENTS 4,875,358 10/1989 Marsh et al. ............................. 73/40

OTHER PUBLICATIONS

Drawing 1-Airburst Testing device with inflatable cuff.
Drawing 2-Airburst testing device with inflatable cuff secured by flat washer.
Drawing 3-Airburst testing device utilizing interference fit or mechanical clamping.

*Primary Examiner*—Hezron E. Williams
*Assistant Examiner*—Joseph W. Roskos
*Attorney, Agent, or Firm*—Gardner, Carton & Douglas

[57] ABSTRACT

An automated condom airburst testing apparatus is disclosed which utilizes a deformable elastomeric ring which operates, in conjunction with a collar, to form a temporary, yet secure, airtight seal around the flexible condom membrane. A multiple stage series regulated inflation gas supply system provides a substantially fluctuation-free flow of gas to inflate a condom. A differential pressure measuring system, which is separate from the inflation supply system, determines the difference between the pressure within the condom membrane and atmosphere. The apparatus also provides the maximum pressure and volume within the condom just before the condom is destroyed by bursting.

25 Claims, 6 Drawing Sheets

METHOD AND APPARATUS FOR AIRBURST TESTING CONDOMS AND THE LIKE

FIELD OF THE INVENTION

The present invention relates generally to the field of condom testing devices, and more particularly to condom airburst testing devices which measure the maximum pressure and volume of a condom by continuously inflating the condom with air until destruction of the condom.

BACKGROUND OF THE INVENTION

One of the conventional methods for testing various characteristics of commercially produced condoms is the socalled "airburst" testing method. The airburst testing method is conducted by inserting over and clamping a condom to a mounting assembly at a predetermined distance from the tip, usually near the base of the condom, to create an air tight seal. After the condom is secured to the mounting assembly, it is inflated with air at a predetermined inflation rate. The internal pressure and volume of the condom is monitored during inflation, wherein the condom is continuously inflated with air, increasing in both pressure and volume, until the condom is eventually destroyed by bursting. The maximum pressure and volume of the condom, produced at an instant just before bursting, is determined and recorded. This maximum pressure and volume information represents the airburst testing characteristics of the condom tested.

Conventional condom airburst testing devices are susceptible to problems related to the secure clamping of a condom to be tested. Prior art devices which utilize an inflatable air bladder, require that the base of an unrolled condom be stretched over the bladder when uninfalted. The bladder is expanded until the edges of the condom are pressed between the inflatable bladder and an outer collar. Such inflatable bladder, frequently do not maintain an airtight seal around the condom. Leakage around the bladder results in undesired errors introduced into the pressure and volume measurements, thereby producing inaccurate readings of air burst testing characteristics. Another problem exhibited with conventional air burst testing devices which use an inflatable bladder is encountered during initial mounting of a condom to be tested. Typical inflatable air bladders require that mounting of a condom be accomplished by stretching it over the air bladder—both a difficult and time consuming task. In the process of stretching a condom over the air bladder the flexible membrane may be damaged, causing premature bursting of the condom during inflation which ultimately results in false airburst testing characteristics. In addition, such conventional devices often require several intricate steps to be performed by an operator to carry out each test.

Prior art airburst testing devices typically monitor differential pressure, i.e. the difference between internal condom Pressure and the atmosphere, using a pressure meter located in the inflation air supply line. Such inline monitoring devices are substantially influenced by changes in air flow rate, thereby resulting in inaccurate pressure readings which reflect instantaneous or transient changes in flow rate. As a result, conventional inline monitoring devices will display the fluctuating instantaneous pressure of the air supply line, rather than directly displaying the actual internal air pressure of the condom itself. Furthermore, conventional inflation air supplies are frequently subject to fluctuations in flow rate, particularly during the inflation process. Thus, the problems with inline monitoring devices are further exaggerated by their great sensitivity to fluctuations exhibited by conventional inflation air supplies.

SUMMARY OF THE INVENTION

It is a primary object of the present invention to provide a condom airburst testing apparatus with an improved clamping mechanism which securely forms a uniform air-tight seal near the base of a condom to be tested.

It is a related object of the present invention to provide such an improved clamping mechanism which allows a condom to be mounted without stretching.

It is another object of the present invention to provide a condom airburst testing apparatus which is substantially automatic so that testing may be easily and efficiently carried out by an operator.

It is another object of the present invention to provide a condom airburst testing apparatus with air inflation supply means capable of producing a steady, predetermined inflation air flow rate which remains substantially free of fluctuations throughout the entire inflation process.

It is another object of the present invention to provide a condom airburst testing apparatus with a differential pressure measurement device capable of continuously monitoring the internal pressure of a condom and rendering pressure readings substantially free from effects of transient or instantaneous fluctuations in inflation flow rate.

The above objects are realized in accordance with the present invention which utilizes a deformable elastomeric ring to create a secure and uniform seal at the base of a condom during inflation. The deformable elastomeric ring is of unique utility during mounting and testing, since the ring is capable of assuming two different physical shapes, dependent upon which operation is being performed. When a condom is being mounted, the condom is unrolled then placed over a thin elongated stem having at its base the elastomeric ring. The open end of the condom reaches past the elastomeric ring. During mounting the elastomeric ring assumes an undeformed and elongated position. With the elastomeric ring in an elongated position, the condom may easily be placed over the ring without binding or stretching. In order to test a mounted condom, a collar is placed around the elastomeric ring, with the lower portion of the condom interposed between the ring and the collar. The elastomeric ring is then deformed, expanding inside the condom base and forcing it against the collar. When fully deformed, the elastomeric ring and collar form a secure and uniform air tight seal around the membrane of the condom The force of the deformed elastomeric ring maintains the condom securely against the collar so that the seal remains airtight throughout the entire inflation process.

The present invention also includes improved inflation supply and pressure monitoring features to overcome the problems with such prior art devices. The inflation supply means of the present invention provides a substantially constant air flow rate by means of a series of first and second pressure regulators followed by a flow control valve with a fine thread adjustment screw to regulate the supply air flow. By providing such a multiple regulator series configuration, fluctuations in the supply air flow are gradually damped resulting in a constant air pressure supply.

An improved pressure measurement mechanism is provided in accordance with the present invention by means of a capillary tube, which extends at one end to a point within the condom itself. The other end of the capillary tube is attached to a differential pressure monitoring device which measures the difference between the internal pressure of the condom and atmosphere. The pressure measurement mechanism of the present invention is thus separate from the inflation air supply apparatus, thereby eliminating any effects on measurements due to fluctuations in the air flow rate during inflation.

BRIEF DESCRIPTION OF THE DRAWINGS

Other objects and advantages of the invention will be apparent from the following detailed description and upon reference to the drawings, in which.

DETAILED DESCRIPTION OF THE INVENTION

Figure 1A:
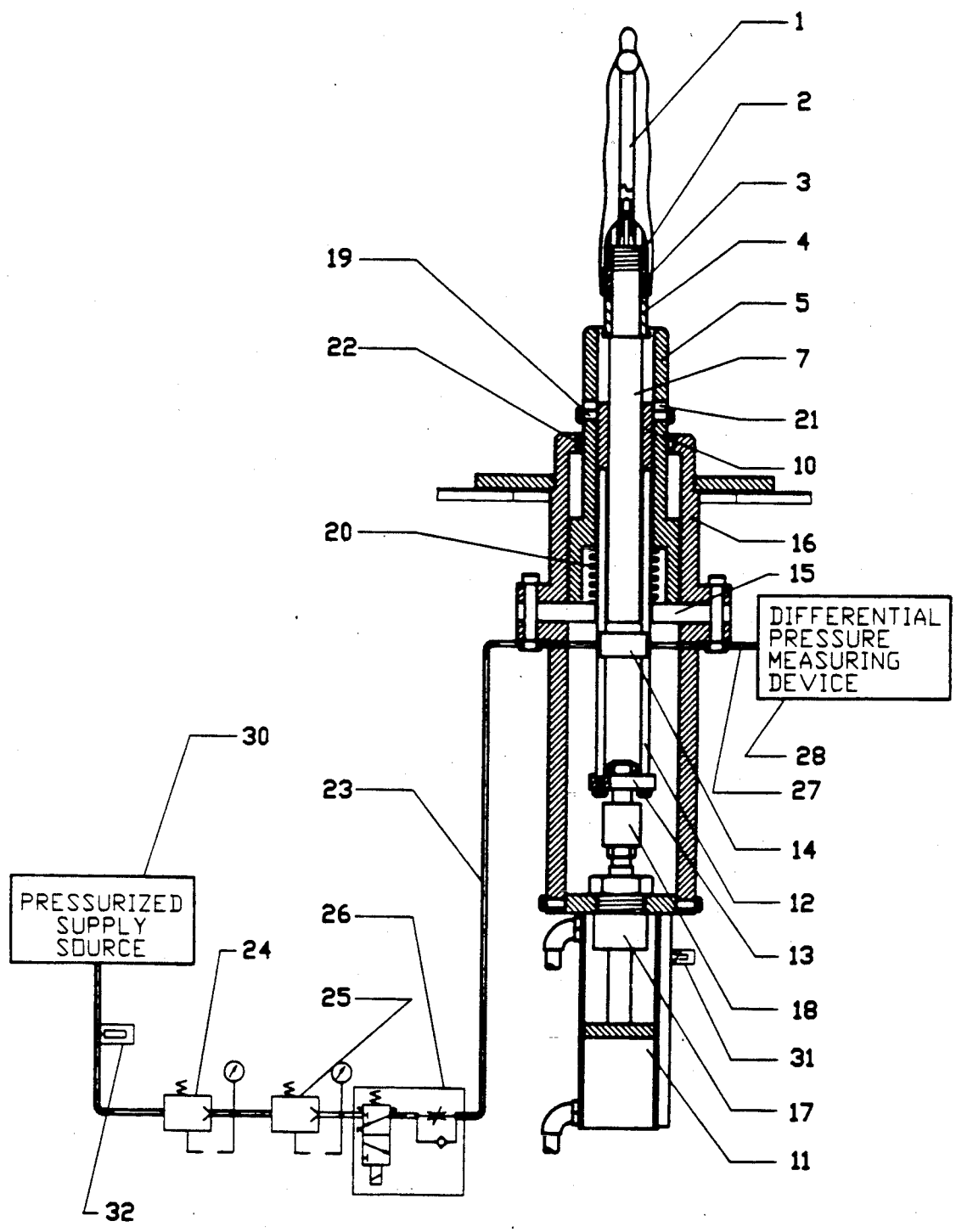
FIG. 1A is a sectional view of a preferred embodiment of the airburst apparatus of the present invention in a loading position.

While the present invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

In particular, the following description refers to a specific embodiment of the present invention when used as a burst testing apparatus for condoms. However, the apparatus may be applied to test by means of inflation the pressure and volume characteristics of any similar flexible membrane. The unique deformable ring feature may be utilized as a means for securely gripping any flexible membrane, for example, during treatment processes of the membrane, without damaging the shape or structure of the membrane. For example, the apparatus may be used in conjunction with a method to apply paint or other treatment to the surface of a balloon. The neck of the balloon may be firmly secured with the deformable ring feature, while the inflation feature may be used to slightly inflate the balloon. After treatment, the balloon may then be released from the grip of the deformable ring without damage to the sensitive neck portion of the balloon's membrane. Thus, the Present invention may find a variety of uses which involve working with various flexible membranes.

Figure 1B:
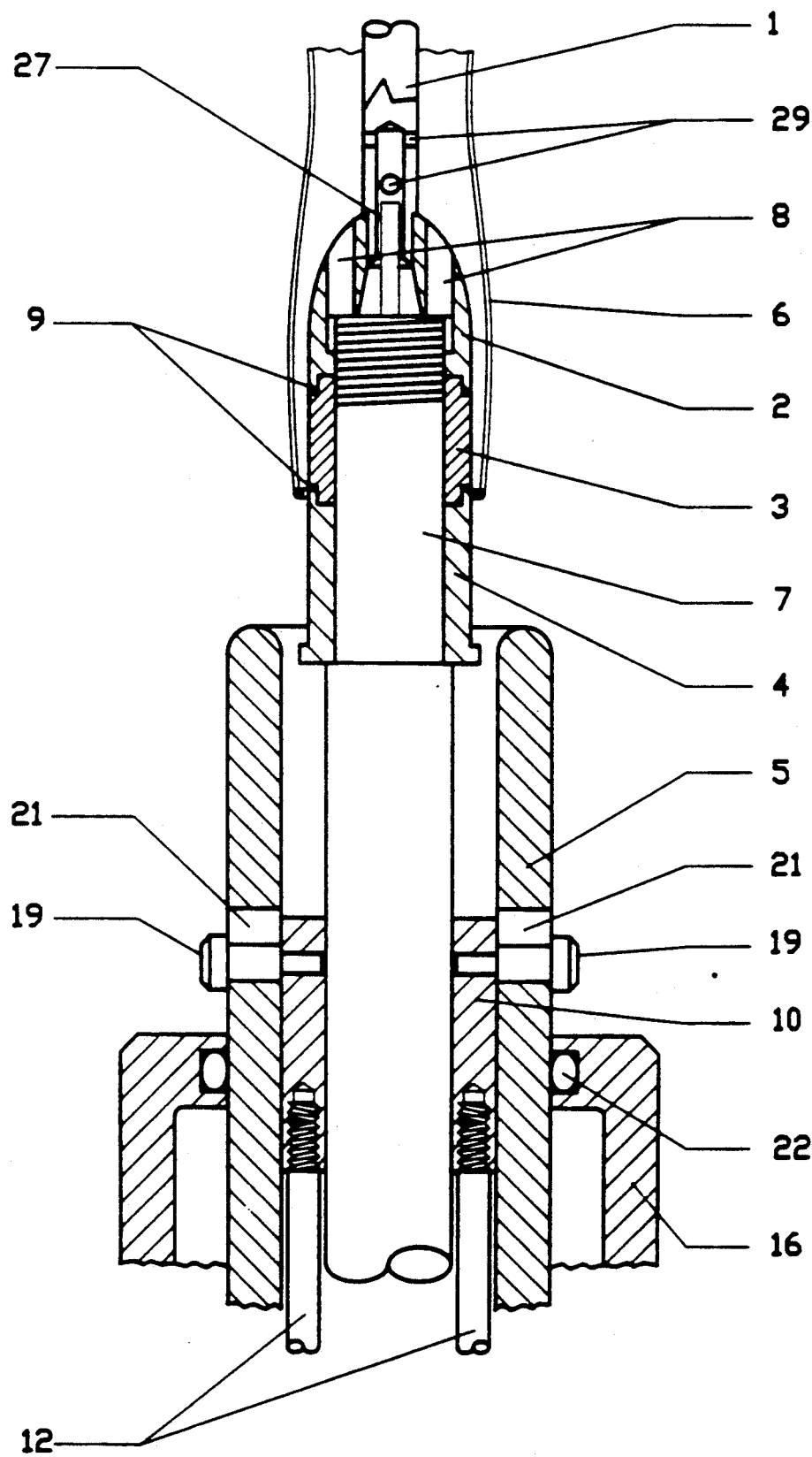
FIG. 1B is a detailed view of the top portion of the apparatus as depicted in FIG. 1A.

Turning now to the drawings and referring first to FIG. 1, there is shown a preferred embodiment of a condom airburst testing apparatus in accordance with the present invention. The condom mounting assembly is comprised of an elongated stem 1, a nose cap 2, a deformable elastomeric ring 3 and a slide 4. The invention is depicted in FIG. 1 in its load position with the collar 5 located below the condom mounting assembly. In order to load a condom 6 onto the mounting assembly, the condom 6 is unrolled then placed over the elongated ball-tipped stem 1 which initially serves to support the condom 6. Since the stem 1 comes into direct contact with the condom 6, the stem 1 should be constructed from a smooth finished material, preferably polished stainless steel. The stem 1 is fixed at a certain predetermined length with respect to the gripping point defined by the deformable elastomeric ring and collar so as to insure that each condom 6 is tested at a constant distance from the tip. Typically, the specified testing distance from the tip of the condom to the gripping point 6 is 150 mm. However, the stem may be easily unscrewed from the nose cap 2 and replaced with another stem 1 of different length if it is desired to test a condom 6 at a different specified distance from the tip.

The rounded nose cap is mounted on a pressure tube 7, and is provided with four equally-spaced vertical passages 8 to allow pressurized air to be transmitted from the pressure tube 7 to the area inside the condom. Carried over the cylindrical pressure tube 7 is the annular slide 4 and the annular elastomeric ring 3. While the apparatus is in the load Position, as in FIG. 1, the slide 4 rests on a step in the pressure tube 7, while the elastomeric ring 3 is gently held in place around the pressure tube 7 between the slide 4 and the nose cap 2. Complimentary steps 9 are provided where the elastomeric ring 3 meets the nose cap 2 and the slide 4, so that the ring 3 is held in fixed relation to the pressure tube 7 during both the loading and the testing processes. Once an unrolled condom 6 is placed over the elongated stem 1, and its lower lip is unrolled past the middle of the elastomeric ring 3, the loading process is completed and the device may then be changed to its testing position.

Figure 2A:
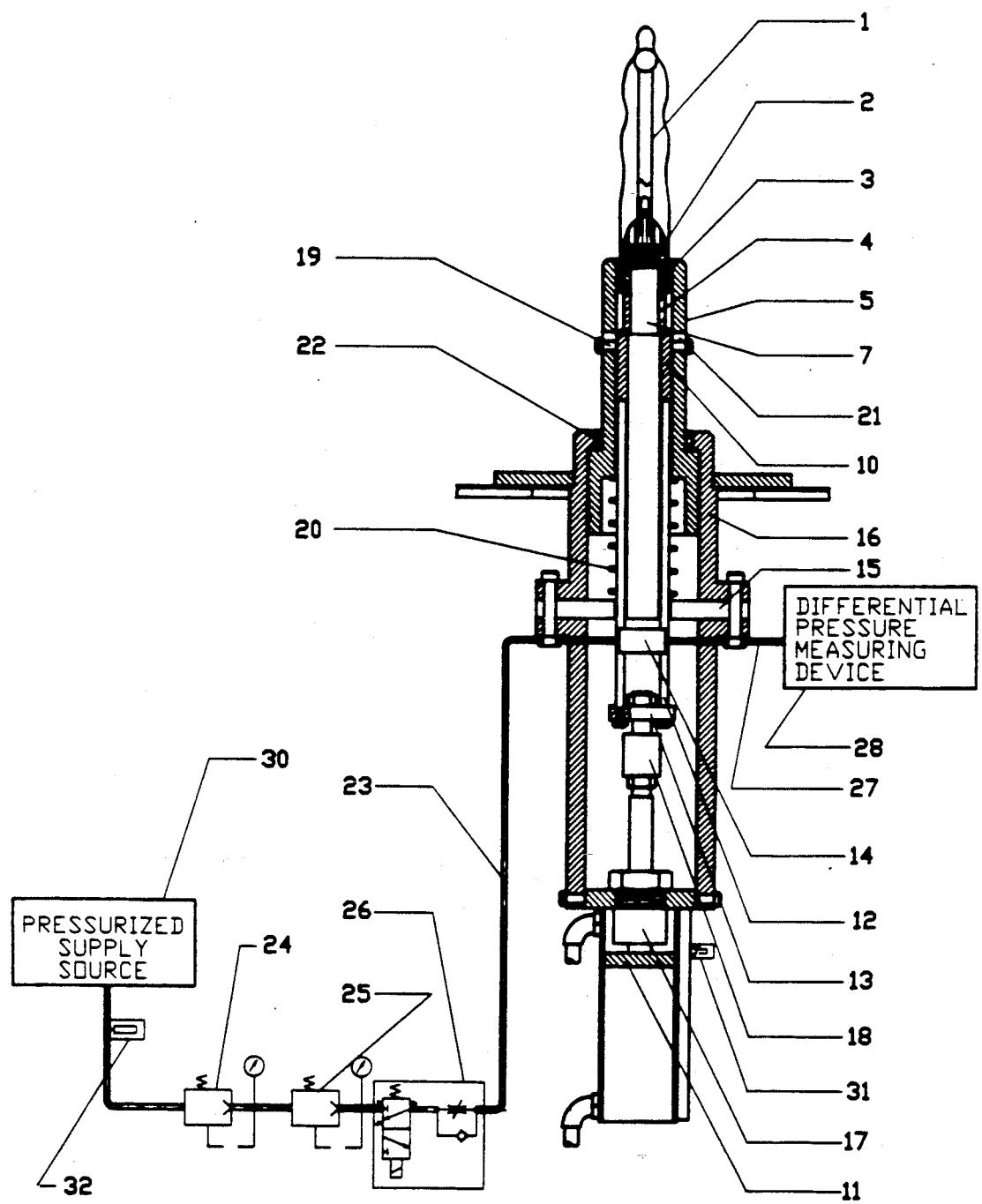
FIG. 2A is a sectional view of a preferred embodiment of the airburst apparatus of the present invention in a "pre-test" position.
Figure 2B:
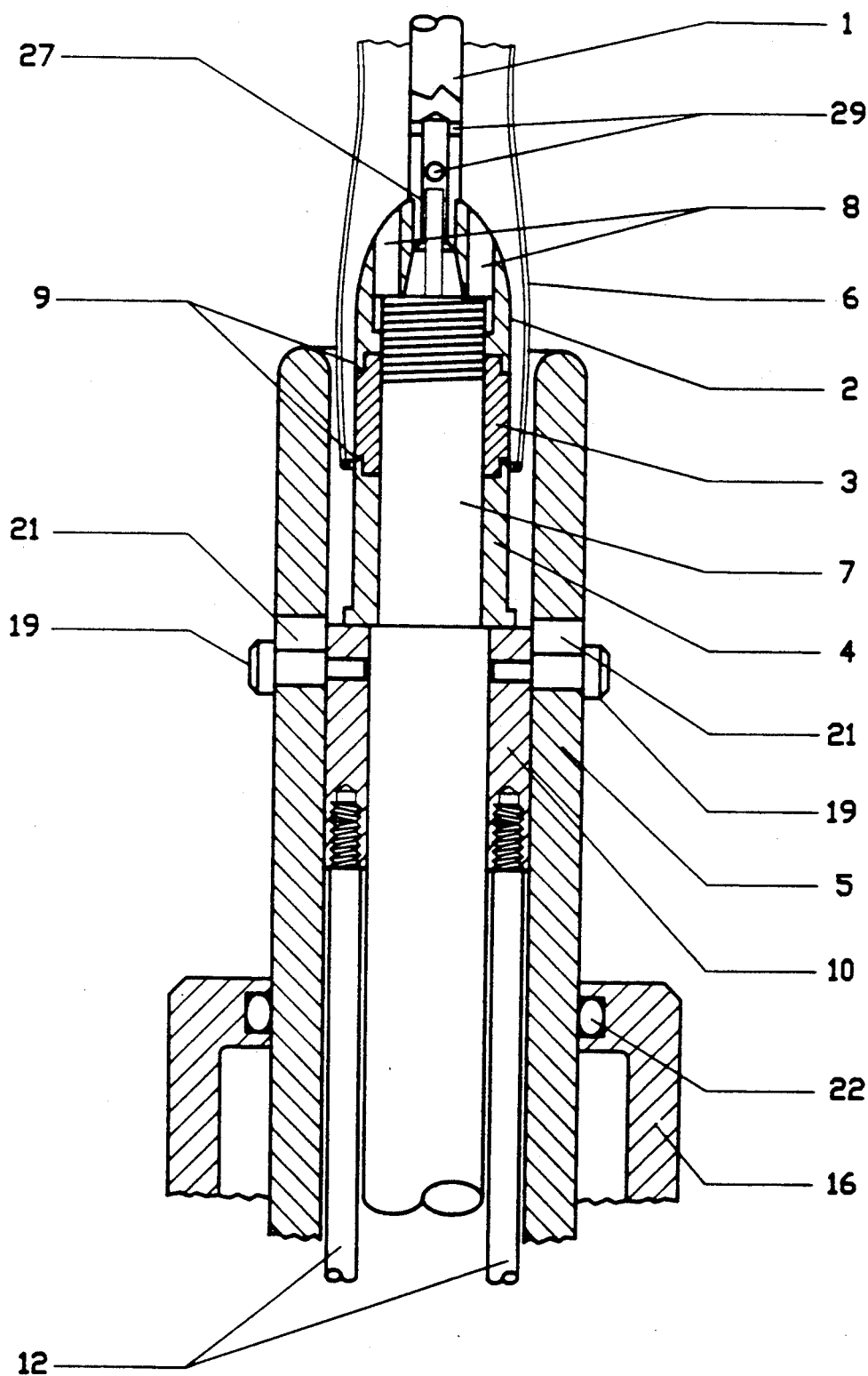
FIG. 2B is a detailed view of the top portion of the apparatus as depicted in FIG. 2A.

Turning now to FIG. 2 there is shown a device of the present invention depicted in its testing position. As can be seen, the collar 5 has been raised to a position wherein its rounded edges extend above the top surface of the elastomeric ring 3. The collar 5, which comes in direct contact with the condom membrane 6, is provided with smooth rounded edges. The collar 5 is preferably treated with a coating having a low coefficient of friction, preferably Teflon. ®Such a teflon coated collar 5 will prevent the condom membrane 6, which expands and moves against the collar 5, from binding or otherwise interfering with the collar 5 during inflation.

In accordance with an important aspect of the present invention, the slide 4 is slidably mounted on the pressure tube 7 in order to firmly abut against and deform the elastomeric ring 3 as shown in FIG. 2. When in its deformed Position, the elastomeric ring 3 expands horizontally, firmly holding the interposed condom membrane 6 to the collar 5. The outer edge of the deformed elastomeric ring 3, operating in conjunction with the inner surface of the collar 5, forms a uniform and secure airtight seal around both the inner and outer surface of the condom membrane 6 throughout the entire contact area. The seal formed can withstand great air pressure well beyond the pressure required to destroy a condom 6 during inflation, without leaking or allowing the secured contact area of the condom membrane 6 to slip.

The deformable elastomeric ring 3 is preferably composed of a gum rubber substance which forms an elongated annular ring when undeformed. Deformation of the elastomeric ring 3 is accomplished by driving the slide 4 upwards with a slidable abutment ring 10 which, during testing, makes contact with the lower portion of the slide 4 thereby forcing the slide 4 upwards. The abutment ring 6 is driven by a double acting piston 11 having a pushrod linkage assembly. The pushrod linkage assembly is comprised of several pushrods which transmit the double acting piston 11 movement from a push rod support plate 13 to the slidable abutment ring 10. Each push rod 12 is threaded at one end into the pushrod support plate 13, and is threaded at the other end into the abutment ring 10. The pushrods 12 are guided through apertures in a mounting plate 15 fixed to the housing 16. Thus, when the apparatus is moved to its testing position, the piston assembly 11 raises the pushrod support plate 13 thereby simultaneously raising the pushrods 12 which causes the abutment ring to slide upwards 10. When the abutment ring 10 makes contact with the slide 4, the elastomeric ring 3 gets deformed between the slide 4 and the nose cap 2.

It should be noted that the nose cap 2, stem 1 and pressure tube 7 always maintain a fixed, unmovable position. Thus, when the slide 4 moves upward, the nose cap 2 maintains its fixed position thereby resulting in the deformation of the elastomeric ring between the fixed nose cap 2 and the upwards forced slide 4. The stroke length of the slide 4 is limited in its upward position to a point which is dictated by the piston abutting against the piston stop plate 17. The maximum slide 4 upward position may, however, be adjusted by a linkage coupling 18 which will effectively increase or decrease the length of the overall linkage assembly. The linkage coupling 18 must set the linkage assembly length such that when the piston 11 is at the top of its stroke and abuts against the piston stop plate 17, the slide 4 will deform the elastomeric ring 3 to form a tight seal around the condom membrane 6. The linkage coupling 18 should be carefully adjusted to avoid both, over-deformation of the elastomeric ring 3 or under-deformation of the elastomeric ring 3 which would result in a weak seal.

The collar 5 is maintained in its downward position by a number of shoulder screws 19 which pull it down against the force of a spring 20. The shoulder screws 19, which extend through slots 21 in the collar 5, are attached to the abutment ring 10. Thus, when the double-acting piston moves 11 to its downward stroke position, the push rod linkage assembly pulls the abutment collar 10 and attached shoulder screws 19 downward. When the abutment collar 10 is pulled downward then the shoulder screws 19 lock into a bottom position in the slots 21 of the collar 10, pulling the collar 10 down as well.

Figure 3A:
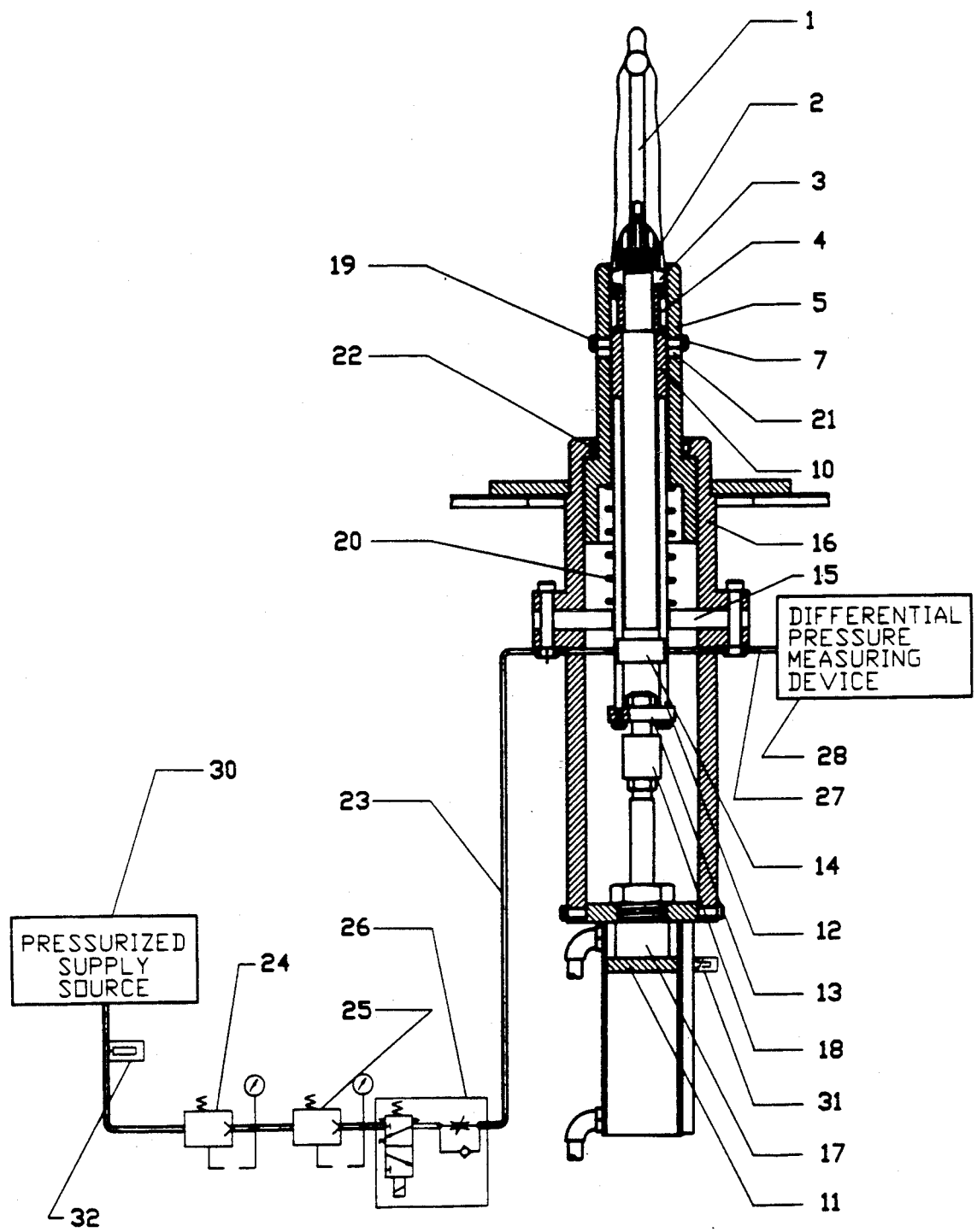
FIG. 3A is a sectional view of a preferred embodiment of the air burst apparatus of the present invention in a test position.
Figure 3B:
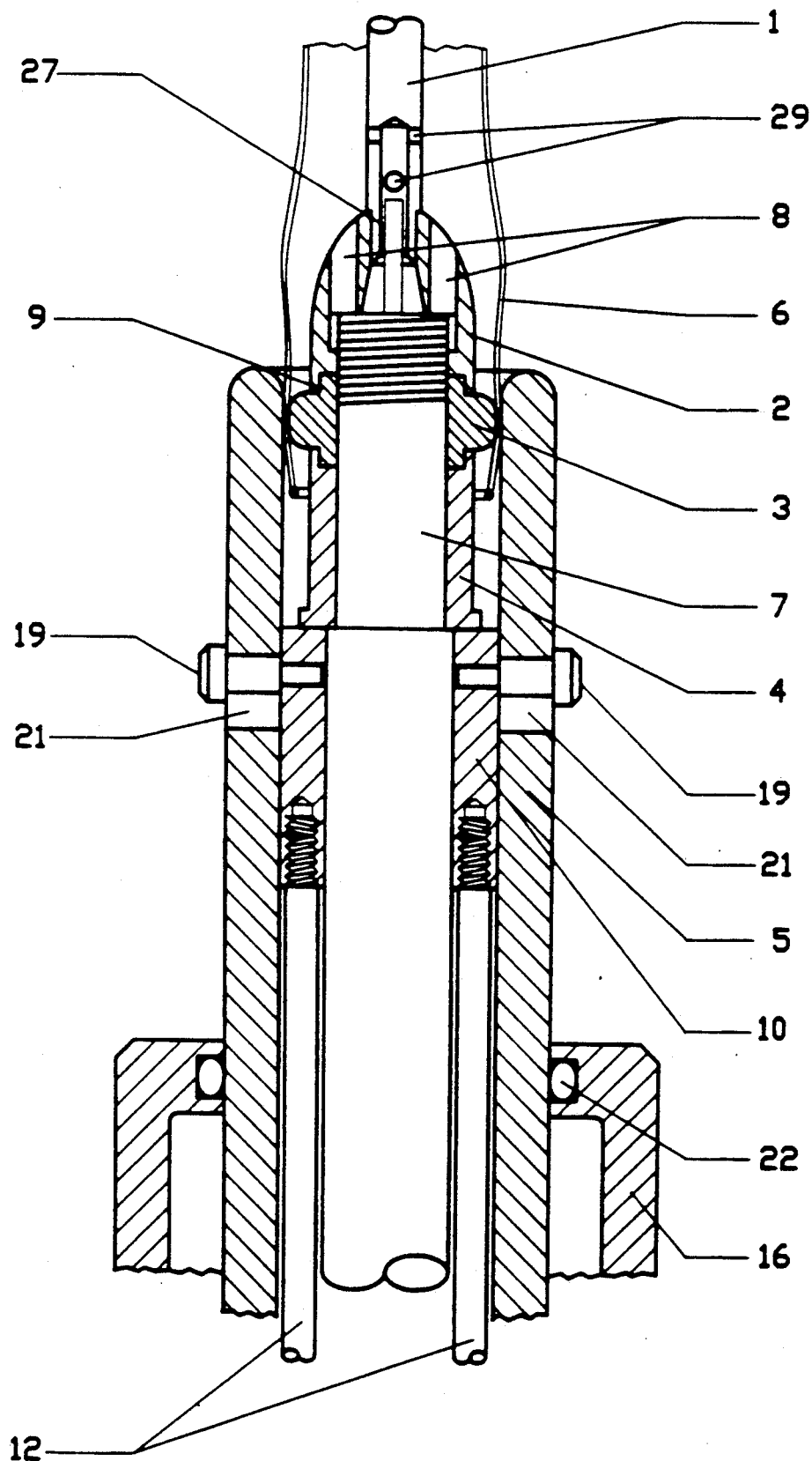
FIG. 3B is a detailed view of the top portion of the apparatus as depicted in FIG. 3A.

To commence a testing operation, the apparatus is moved from the downward load position, as in FIG. 1, to an upward "pretest" position, as in FIG. 2, and then eventually to the test position as in FIG. 3. After a condom 6 is loaded onto the mounting assembly while the apparatus is in its loading position, the double-acting piston 11 is actuated and begins to move upwards from its lowest stroke position. As the doubleacting piston 11 moves upwards the abutment collar 10 with attached shoulder screws 19 moves upward as well, allowing the collar 5 to move upward due to the force of a spring 20 acting on a lower abutment surface of the collar 5. The collar 5 continues its upward movement until its upper abutment surface meets with the collar housing 16 as shown in FIG. 2.

At this point the apparatus is in its "pretest" position, characterized in that the collar 5 is raised as far as it will go, while the deformable elastomeric ring 3 is still in its elongated position. In order to prevent debris from falling between the collar 5 and the collar housing 16, a flexible "O" ring 22 is preferably set in a recess in the collar housing 16 and extends closely around the outer edge of the collar 5. The "O" ring 22 then catches any debris which may fall between the two surfaces which eventually could rest on the collar abutment surface, resulting in the collar 5 assuming a test position so low that it no longer extends around the elastomeric ring 3. Continuous upward movement of the double-acting piston takes the apparatus from its pretest position to its final test position as shown in FIG. 3. The continued upward movement of the double-acting piston 11, causes the upper surface of the abutment collar 10 meet with the lower surface of the slide 4, thereby causing the slide 4 to ride up on the pressure tube 7 and deform the elastomeric ring 3 into its test position. A magnetic reed switch 31 is provided to indicate when the piston is at its top position.

When the slide 4 is at its top position and the elastomeric ring 3 is fully deformed, the pressure tube 7 transmits a flow of air into the secured condom 6, continuously inflating the condom 6 until it bursts. After the test is completed, the double-acting piston 11 is moved downward bringing with it the abutment ring 10 and the collar 5. As the abutment ring 10 moves down the pressure tube 7, the slide 4 moves down as well thereby allowing the elastomeric ring 3 to move from its deformed position back to its elongated position. The collar 5 is moved down to its lowest position wherein the bottom of the collar 5 rests against a mounting plate 15. At this time the destroyed condom is removed and replaced with a new condom to be tested.

Turning back to FIG. 1, there is shown an improved inflation air supply feature, an important aspect of the present invention. It should be noted that although the inflation supply system as depicted provides a pressurized supply of air for inflation, any other gas may be used as well to inflate the condom. For example, a gas which is lighter than air, such as helium may be used. In this regard, the apparatus of the invention may be used to determine if there are small pores through which such a lighter gas would escape. This could be carried out by inflating the condom partially, then monitoring to pressure to determine if it drops, thereby indicating that the gas is escaping. For the purposes of the depicted embodiment of the present invention for airburst testing, the condom is supplied with pressurized air.

The inflation supply system is comprised of an air supply tube 23 which runs from a conventional pressurized air supply source 30 to a fitting 14 attached to the bottom of the pressure tube. Along the length of the air supply tube 23 is attached, in series, a first pressure regulator 24, a second pressure regulator 25 and a flow control and calibration device 26. The first pressure regulator 24 reduces the direct air pressure from the pressurized air supply source 30 from the source pressure level to a median air pressure level. The second pressure regulator 25, preferably a precision adjustable instrument, further reduces the air pressure supply from the first pressure regulator 24 from the median level to a final level for supply to the pressure tube 7. The flow control and calibration device 26 then provides a fixed area opening through which the constant supply pressure passes, insuring a constant air flow rate supplied to the pressure tube 7. By providing a series multiple stage air pressure reduction system as this, the inflation air supply flow rate may be finely adjusted and maintained at a substantially fluctuation-free flow.

Conventional air supply systems typically contain only a single pressure regulator which must transform the initial air supply from the pressurized air supply device to the final air supply to the pressure tube. Since the single pressure regulator in this situation must make a substantial change in the air Pressure, undesired fluctuations and disturbances in the produced air flow result which prevent a steady flow rate from being supplied to the pressure tube. In order to avoid this undesired flow fluctuation, the air supply system of the present invention gradually reduces, at several stages, the supply air pressure to the desired level for supply to the pressure tube. By operating in such a manner, each of the pressure regulators produces only a slight disturbance of the air flow, thereby effectively damping the supply fluctuations.

In a preferred embodiment of the air supply system according to the present invention, the conventional pressurized air supply source 30 is set to produce a source air pressure level of between approximately 80 and 100 p.s.i., which is then supplied to the first pressure regulator 24. The first pressure regulator 24 then reduces the source air pressure to a level between approximately 20 and 50 p.s.i., which is then supplied to the second precision adjustable, pressure regulator 25. This second pressure regulator 25 may then be adjusted to reduce the air pressure to the final level, a level which is Preferably between about 5 and 10 p.s.i. The inflation flow rate specified for supply to the pressure tube is preferably about 15 liters per minute. The adjustable flow control 26 may be finely adjusted with, for example, a fine micrometer threaded adjustment screw to set the flow rate to the pressure tube 7.

The volume of air supplied to the condom may easily be determined by measuring the amount of time spent inflating the condom, i.e. the inflation period. For example, if the fixed inflation flow rate is set at 15 liters per minute and the condom is inflated for one minute, then the present volume of air supplied to the condom is 15 liters. In this regard, the apparatus of the present invention is preferably provided with a timer, which is reset when inflation is initiated, and continues to run until the condom bursts. When the condom bursts, the maximum condom volume is determined to be the product of the fixed flow rate and the inflation period, as measured by the timer.

Another important aspect of the present invention is provided in the manner in which the condom air pressure level is monitored. In accordance with the present invention, the condom air pressure is monitored by a system which is separate from the air supply system. By providing a separate pressure monitoring system the internal air pressure of the condom may be measured directly, rather than indirectly through the inflation air supply system. The present invention thereby avoids the drawbacks of prior art air pressure monitoring systems located in the air supply line, such as substantial influence of the monitored pressure by changes or disturbances in the air supply.

The differential air pressure, i.e. the difference between the condom internal pressure and the external atmospheric pressure, is measured by means of a capillary tube 27 which extends between the nose cap 2 and a differential pressure measuring device 28. The internal condom pressure is transmitted to the capillary tube 27 through two cross drilled holes 29 in the stem. The cross drilled holes 29, which extend completely through the stem 1, allow an air passage to the capillary tube 27 which is distinct from the air supply vents 8 in the nose cap 2. A differential pressure monitoring device 28, located at the other end of the capillary tube 27, measures the difference between the internal condom pressure and atmosphere.

Typically, the differential pressure monitoring device 28 will be a transducer which uses a flexible diaphragm affected by the difference between the internal pressure of the condom and atmosphere. A suitable commercial differential pressure transducer is manufactured by the DWYER corporation, and is model number 602-4. This differential pressure transducer transforms a pressure from about 0 to 5 KPa into an electrical current in the range of about 4 to 20 ma. By connecting the electrical output of the transducer to a current meter, the deflection of the current meter will represent the differential pressure between the area within the condom and atmosphere.

Preferably, however, a more sophisticated monitoring device will be used which reflects the maximum attained differential pressure level until the device is reset. Such a device is advantageous in this particular application because it would not require an operator to constantly monitor the differential pressure level to determine the maximum attained differential pressure. For example, when a condom has been mounted and the apparatus is placed in its test position, the maximum reading monitoring device may be reset to begin the new test. As the pressure increases in the condom, the maximum pressure reading increases until the point where the condom bursts. At this point the differential pressure will drop dramatically, but the maximum pressure reading will continue to be displayed until the meter is reset. Thus, an operator may conduct the test and then read the maximum pressure from the meter, without having to be concerned about viewing the meter at the instant the condom bursts in order to record the maximum pressure.

According to a preferred embodiment of the present invention, the dimensions of the inside diameter of the capillary tube 27, the cumulative area of the inflation outlets 8 and the diameter of the cross-drilled holes 29, are substantially maintained at predetermined values, which are, respectively, 0.084 inches, 360 square inches and 0.062 inches. It is considered that these predetermined dimensions result in the best possible response characteristics for the differential pressure transducer device 28. For example, it has been observed that when a capillary tube 27 with a smaller inside diameter is used by the system, the pressure reflected by the differential pressure transducer device 28 lags behind the actual internal condom pressure.

One particular advantage of the pressure monitoring system of the present invention is that the measured differential pressure remains substantially independent of the air flow rate at the nose cap inflation outlets. For example, when the preferred dimensions of the system are employed, it has been found that the measured differential pressure value is not been perceivably affected by inflation flow rate changes as high as ten times the typical flow rate used for inflation.

In accordance with another important aspect of the present invention, the airburst testing process is automated, requiring an operator only to load the condom initially. Preferably, the operative devices of the present invention are connected to a conventional programmable logic controller which monitors and controls the devices. After loading an unrolled condom on the mounting assembly, the operator pushes a process initiation switch which begins the testing. When the process initiation switch is pressed the piston is actuated, driving from its loading position upwards to its testing position. A magnetic reed switch 31 located in a mounting track along the piston cylinder determines when the piston has reached the top of its stroke. When the piston reaches the top of its stroke, the magnetic reed switch 31 signals the logic controller which simultaneously carries out three separate functions. First, the controller operates a solenoid valve 32 which introduces the presurized air supply source 30 to the system. Second, the controller resets an inflation timer thereby initiating a new inflation period. Third, the controller resets the differential pressure measuring device 28 thereby resetting the previous maximum pressure value. At this point, the inflation process continues with the condom increasing in both volume and pressure until it bursts.

The differential pressure measuring device 28 determines when the condom bursts when the device 28 measures a drastic reduction in differential pressure. The differential pressure measuring device 28 then signals the logic controller which simultaneously operates the solenoid valve 32 to shut off the air supply source 30, stops the timer to denote the end of the inflation period and activates the piston to drive it to the bottom of its stroke. When the piston reaches the bottom of its stroke, the destroyed condom membrane is released from between the elastomer ring and the collar. To begin a new testing sequence, an operator then removes the broken membrane, Places a new condom on the mounting assembly and depresses the process initiation switch again.

As is apparent from the foregoing description, the apparatus of the present invention provides an accurate and conveniently automated means for airburst testing condoms. The illustrative embodiment which utilizes a deformable elastomeric ring which functions, in conjunction with a collar, to form a temporary, yet secure, airtight seal around the flexible condom membrane. A novel air supply inflation means supplies a substantially fluctuation free air flow to a pressure tube which, in turn, supplies air to inflate the sealed condom with apertures which extend through an attached nose cap. A novel differential air pressure monitoring system, which functions separately from the inflation system, determines the maximum inflation pressure of the condom. By means of a double-acting piston operatively associated with the collar, the collar may be automatically lowered to facilitate loading of a condom, and automatically raised around the compressible elastomeric tube to secure a condom for testing.

What is claimed is:

1. An apparatus for forming a temporary, secure seal around the inner and outer surfaces of an annular portion of a thin, flexible membrane of a particular unflexed diameter, said apparatus comprised of:
    an annular collar disposed around said annular portion of said thin flexible membrane,
    a deformable elastomeric ring disposed within said annular portion of said think, flexible membrane, said deformable elastomeric ring being capable of assuming a first undeformed position with an outer diameter which is smaller than said inner diameter of said collar, and a second deformed position in which said ring expands transversely to an outer diameter limited by said annular collar, thereby forming a seal around said think, flexible membrane interposed between said elastomeric ring and said annular collar,
    deformation means for selectively working said elastomeric ring between said deformed position and said undeformed position.

2. The apparatus as set forth in claim 1 wherein said annular collar has an inner diameter which is slightly larger than said unflexed diameter of said thin, flexible membrane.

3. The apparatus as set forth in claim 1 wherein said outer diameter of said elastomeric ring in said first undeformed position is slightly smaller than said unflexed diameter of said thin, flexible membrane.

4. The apparatus as set forth in claim 1 wherein said deformable elastomeric ring is carried on an elongated cylindrical support member which extends into said annular portion of said thin, flexible membrane.

5. The apparatus as set forth in claim 4 wherein said deformation means is comprised of an abutment surface fixed to said elongated cylindrical support member and an annular which is slidably carried on said elongated cylindrical support member, wherein said slide is capable of deforming said elastomeric ring against said abutment surface thereby causing said elastomeric ring to assume its deformed position.

6. The apparatus as set forth in claim 1 wherein one end of said annular portion of said thin, flexible membrane is open and the other end of said annular portion of said thin, flexible membrane forms a continuous closed surface.

7. The apparatus as set forth in claim 6 wherein said thin, flexible membrane is a condom.

8. The apparatus as set forth in claim 6 further comprising means for inflating with a gas said closed end of said membrane.

9. The apparatus as set forth in claim 8 further comprising means for measuring the internal volume and pressure within said closed end of said membrane during inflation.

10. The apparatus as set forth in claim 9 wherein said measuring means is comprised of
    a tube disposed such that one end extends into the closed end of said membrane and is exposed to the internal pressure within said closed end of said membrane, and the other end is connected to a differential pressure measuring device which measures the difference between the internal pressure within said closed end of said membrane and atmosphere.

11. The apparatus as set forth in claim 9 wherein said measuring means is capable of supplying the value of the maximum pressure and volume within said closed end of said membrane during inflation.

12. The apparatus as set forth in claim 11 wherein said closed end of said membrane is inflated until destruction by bursting and said measuring means is capable of supplying, after the destruction of said membrane, the maximum pressure and volume within said closed end of said membrane before destruction.

13. The apparatus as set forth in claim 8 wherein said inflating means is comprised of a gas pressure source which is regulated to a fixed gas flow rate through a series of multiple pressure regulators, thereby supplying a substantially fluctuation free flow of gas for inflation.

14. The apparatus as set forth in claim 13 wherein said fixed gas flow rate is supplied to said thin, flexible membrane through a fixed orifice of predetermined cross sectional area.

15. The apparatus as set forth in claim 14 further comprising a volume measuring device capable of supplying the value of the volume of said gas supplied to said thin, flexible membrane by determining the product of said fixed gas flow rate and the inflation period.

16. A method for burst testing a condom, said method comprised of the steps of:
   placing a lower portion of said condom over an elastomeric ring,
   positioning an annular collar around said lower portion of said elastomeric ring,
   deforming said elastomeric ring such that said ring expands against said condom and said collar, thereby forming a uniform airtight seal within said lower portion of said condom,
   inflating said condom with a supply of gas,
   measuring the internal pressure within said condom during said inflating step.

17. The method as set forth in claim 16 wherein said condom is inflated until it is destroyed by bursting.

18. The method as set forth in claim 16 wherein said gas is air.

19. The method as set forth in claim 16 wherein said measuring step includes measuring the maximum internal pressure within said condom.

20. The method as set forth in claim 16 wherein said rigid annular collar is removed from around said elastomeric ring during said placing step.

21. The method as set forth in claim 16 wherein said measuring step is carried out by means of a tube with one end which extends inside the condom, and the other end is connected to a differential pressure measurement device.

22. The method as set forth in claim 21 wherein said inflating step involves supplying said gas to said condom through an aperture with an area greater than the cross sectional area of the opening of said tube.

23. The method as set forth in claim 21 wherein the inside diameter of said tube is greater than or equal to about 0.060 inches.

24. The method as set forth in claim 16 wherein said inflating step is carried out by means of a source gas pressure supply which is regulated by a multiple stage pressure regulator system so as to supply a substantially fluctuation-free gas supply for inflating said condom.

25. An apparatus for forming a temporary, airtight seal around the inner and outer surfaces of an annular portion of a thin flexible membrane, said apparatus comprised o:
   an elongated cylindrical support member,
   an abutment member secured in fixed relation to said cylindrical support member, wherein said abutment member maintains an abutment surface which runs substantially transverse to the longitudinal axis of said elongated cylindrical support member,
   an annular slide carried on said elongated cylindrical support member, said annular slide being capable of sliding longitudinally along said cylindrical support member,
   an annular collar with inner diameter larger than the outer diameter of said slide,
   and an annular elastomeric ring carried on said elongated cylindrical support member between said abutment member and said annular slide which assumes a first undeformed position in which said elastomeric ring forms a generally elongated shape with an outer diameter which is smaller than the inner diameter of said annular collar, and a second deformed position when deformed between said generally transverse abutment surface and said slide in which said elastomeric ring expands transversely, gripping the annular portion of said thin flexible membrane interposed between said elastomeric ring and said collar.

* * * * *